United States Patent [19]

Meyer

[11] Patent Number: 5,622,310

[45] Date of Patent: Apr. 22, 1997

[54] ADAPTIVE RECOVERY CONTROL SCHEME FOR CONVENTIONAL AND HEAT PUMP SYSTEMS

[76] Inventor: Jeffrey R. Meyer, 3217 E. 25 St., Minneapolis, Minn. 55406

[21] Appl. No.: 505,505

[22] Filed: Jul. 21, 1995

[51] Int. Cl.⁶ .............................. F23N 5/20; G05D 23/00
[52] U.S. Cl. ........................................ 236/46 R; 165/239
[58] Field of Search ............................ 62/231; 236/46 R, 236/47; 165/239, 241

[56] References Cited

U.S. PATENT DOCUMENTS 4,702,305  10/1987  Beckey et al. ..................... 165/239 X
5,219,119   6/1993  Kasper et al. ..................... 165/239 X
5,259,445  11/1993  Pratt et al. ....................... 165/241

*Primary Examiner*—William E. Wayner
*Attorney, Agent, or Firm*—Robert B. Leonard

[57] ABSTRACT

An adaptive recovery process and apparatus for use in temperature control devices for controlling different kinds of HVAC plants. The process and apparatus include main and auxiliary heat ramps in the adaptive recovery portion for dealing with both conventional and auxiliary stages within one process and apparatus.

3 Claims, 8 Drawing Sheets

ADAPTIVE RECOVERY CONTROL SCHEME FOR CONVENTIONAL AND HEAT PUMP SYSTEMS

BACKGROUND OF THE INVENTION

The present invention relates to the field of heating, ventilating and air-conditioning and more particularly to the area of temperature controls.

Thermostats have in more recent times have been constructed in two major components: a housing and a sub-base. Prior art FIG. 1 provides an example. The thermostat 200 included a housing 201 and a sub-base 202. The housing usually contained a temperature sensor (not shown), a display 215 and some form of a setpoint selection means, here shown as keys 206 through 211. The display and setpoint selection means were sometimes jointly referred to as the user interface. The sub-base included typically included wiring terminals to connect the thermostat to an HVAC plant. The HVAC plant may include any or all of the following: heat pump, air-conditioner, furnace (either fossil fuel or electric), boiler and fan.

An advance in the thermostat field occurred when a controller was used for control functions within a thermostat such as the thermostat described in U.S. Pat. No. 4,606,401 (Levine) issued Aug. 19, 1986 and commonly assigned with the present invention. The controller acted on preprogrammed instructions and stored, user entered parameters to control a temperature within a space to a desired setpoint at a given time. The controller generally used was a microprocessor. Setpoints were associated with time periods throughout the day. When the time crossed a time period boundary, a new setpoint was used (which may be the same temperature as the previous setpoint).

In order to increase the temperature of a space controlled by such a thermostat, especially at the boundaries of time periods, adaptive recovery processes were developed. In FIG. 2, a prior art time versus temperature graph is shown. SP1 indicates the setpoint of the thermostat between times t0 and t1 and SP2 indicates the setpoint after time t1. In order to have the actual temperature (represented by continuous points AT) reach SP2 at or before time t1, a ramp begins at time t2. Once the AT crosses the ramp, the setpoint snaps to SP2.

Usually, a thermostat was configured to operate only with one type of HVAC plant at a time. For example, because of the differing control requirements for a heat pump, an electric furnace and a fossil fuel furnace and an air conditioning system, a thermostat was set up to handle only one of these types of HVAC plant. In particular, different adaptive recovery processes were required for heat pumps and furnaces. This led to different thermostats being required for each.

SUMMARY OF THE INVENTION

The present invention is a thermostat with and a process for adaptive recovery which works for both conventional furnaces and heat pumps. The thermostat, in a preferred embodiment includes two main pieces: a user interface panel residing a subbase placed near the HVAC equipment. The two pieces talk via a communication line.

The adaptive recovery process resides in the subbase as part of the HVAC system controller. When enabled, the adaptive recovery algorithm is executed every 20 seconds. Adaptive recovery from a setback period is accomplished through a step jump approach. The step jump is initiated by use of a recovery ramp/line whose origin is at the target temperature. In another embodiment, the origin is at the target temperature time minus 15 minutes.

The sensed temperature is compared to the current ramp/value. When the sensed temperature crosses the current ramp/line, the algorithm enters recovery mode and the set point temperature snaps to the upcoming period's target set point temperature. This action permits energizing (but does not guarantee) all stages on conventional subbase models and all non-auxiliary stages on heat pump subbase models. During recovery, the new recovery set point is displayed in the UIP display.

For heat pump subbases with the auxiliary (AUX) stage configured, a secondary or auxiliary heat ramp/line is used to re-enable the auxiliary heat stage that was disabled when the heating mode recovery began. When the sensed temperature falls below the current auxiliary ramp/value, the auxiliary stage is re-enabled and can then be used, if required by the temperature control algorithm. The auxiliary stage cannot energize until the auxiliary ramp/line is crossed unless auxiliary cycling occurred after the start of the last period and before the start of the recovery period.

The auxiliary ramp/line's slope in a preferred embodiment may be adjusted to be twice that of the primary ramp/line's slope. A lower slope limit of 5° F./hr is applied to the auxiliary slope in the preferred embodiment. For heat pump applications, the invention has an adjustable auxiliary heat ramp/line that works with the main heat ramp/line. This helps to minimize auxiliary stage usage, but still guarantee timely recoveries.

The thermostat also watches for situations that require a need to override the auxiliary heat stage disable feature. For example, sometimes auxiliary heat is needed in normal setback mode just to maintain the desired programmed temperature. The thermostat stores such information in memory and then permits auxiliary heat usage when recovery begins.

Further, the thermostat attempts to correct certain recovery variables (e.g. slope values) for more accurate temperature recoveries only once per period regardless of the number of interruptions occurring to the recovery process during the period (e.g. user reprogramming, blackouts, brownouts, temporary sensor failure, etc.) Some recovery schemes cancel the "correction" sequence when an interruption occurs.

In addition, the algorithm only updates the slope if a "fair" chance to recover occurred. For example, a bad sensor lost during recovery means the attempt to recover was interrupted and makes the result unallowable. The process would not adjust the slope in this case. Another example, the user reprograms the period during recovery active mode. If the result was that AT was permitted to recover the ramp (have, a fresh start to recover), a slope update would be permitted.

DESCRIPTION OF THE PREFERRED EMBODIMENT

Figure 1:
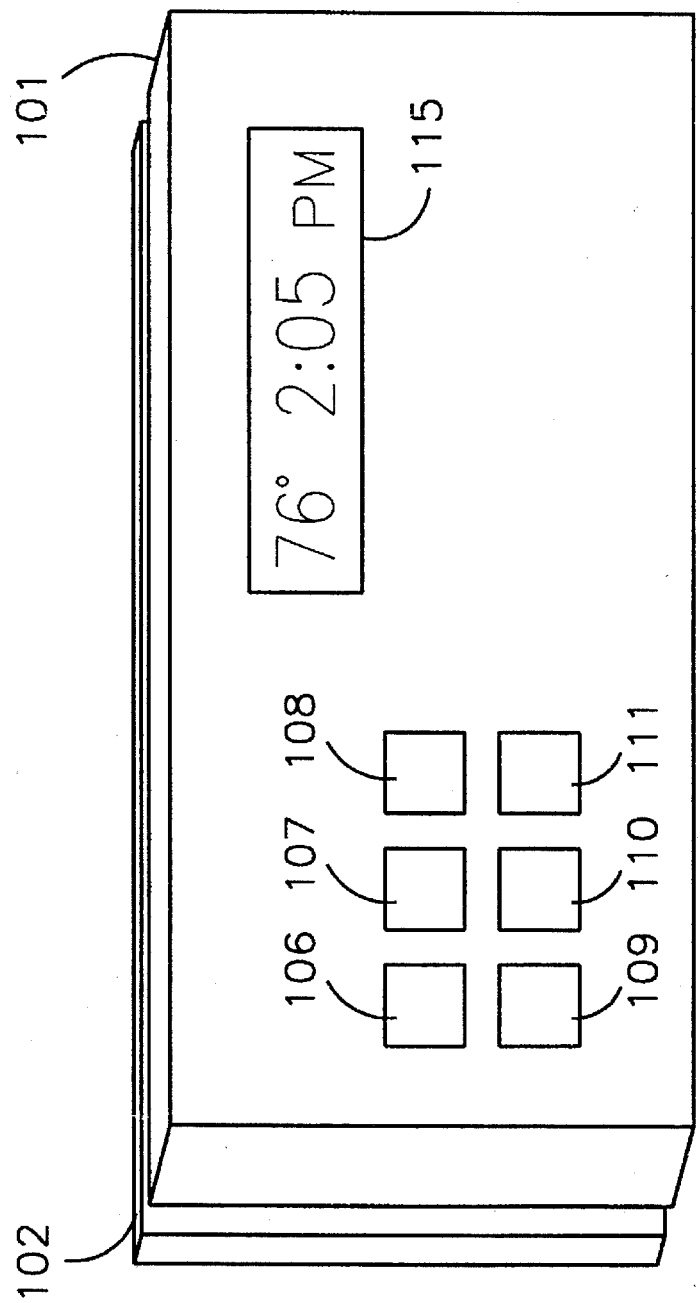
FIG. 1 is a perspective view of a thermostat of the prior art.
Figure 2:
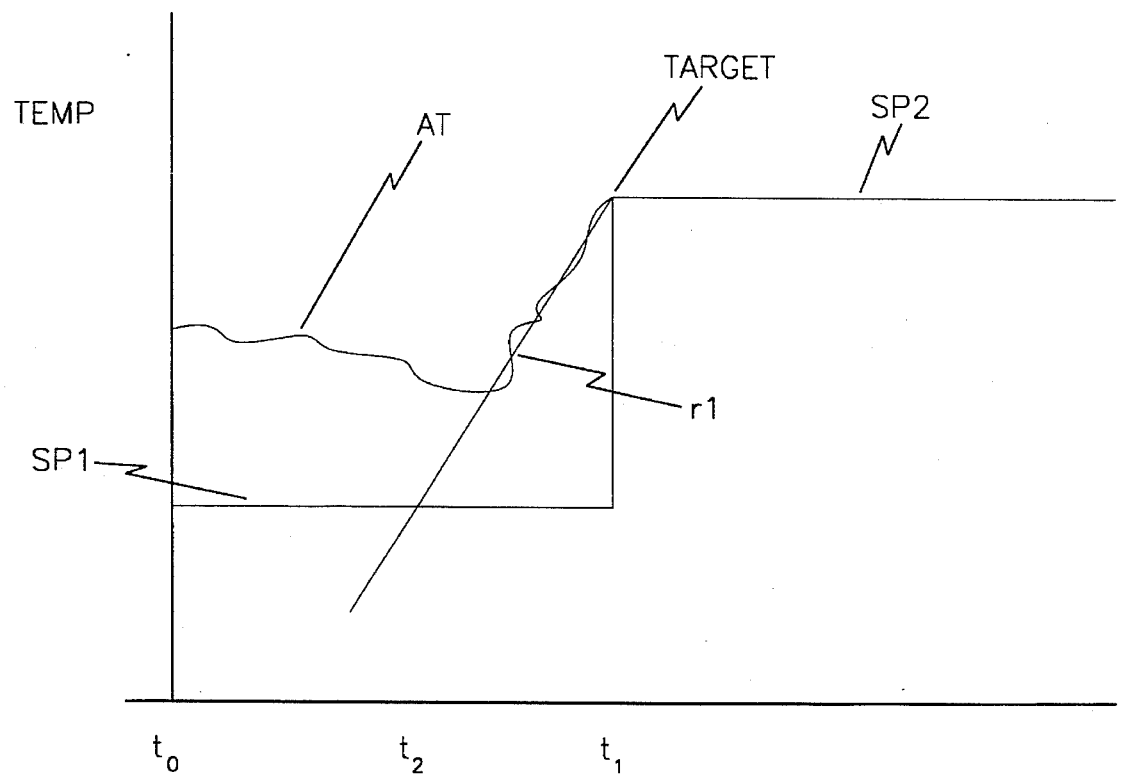
FIG. 2 is a time versus temperature graph of a setpoint period change and ramp used in a prior art adaptive recovery scheme.
Figure 3:
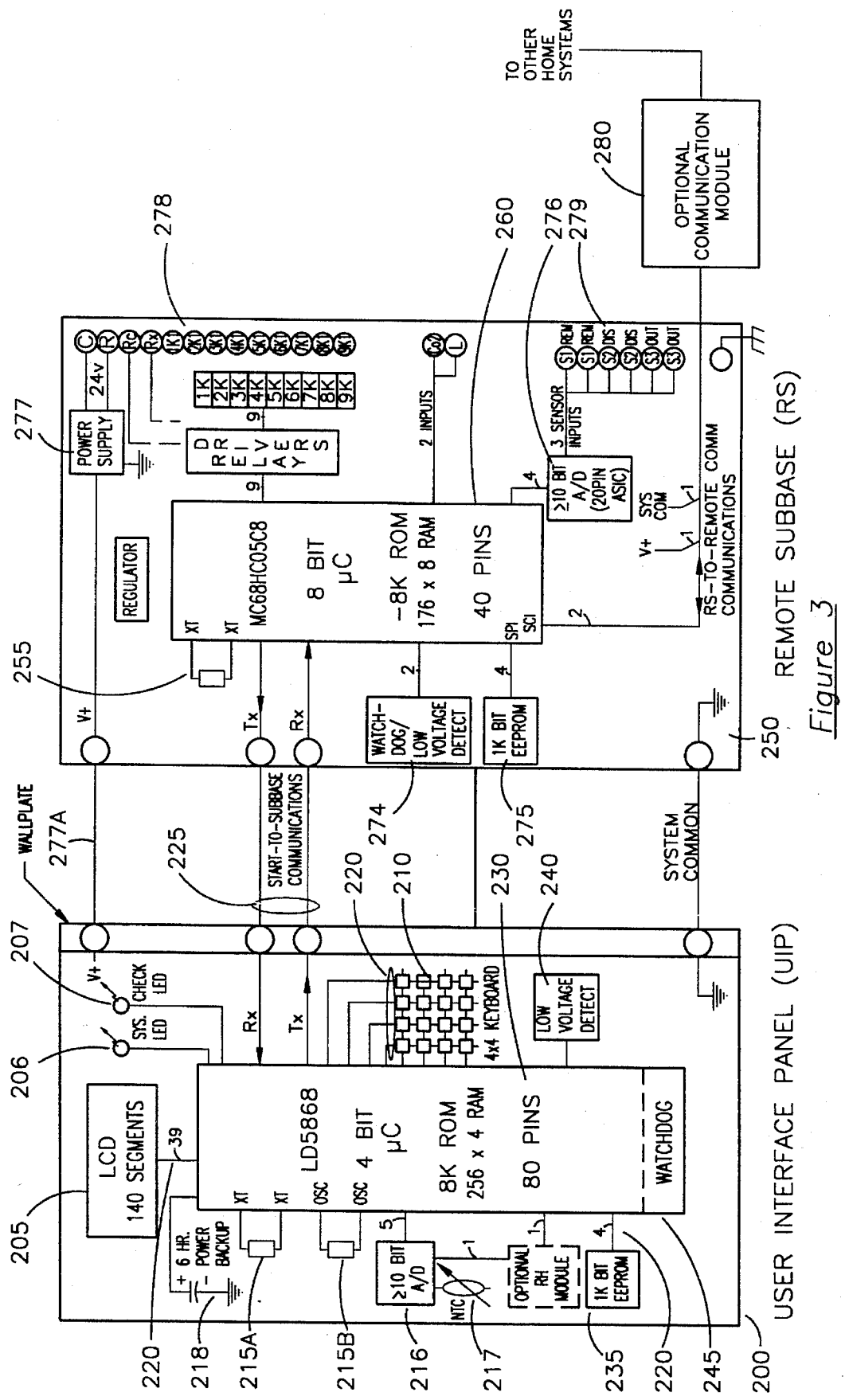
FIG. 3 is a block diagram of the user interface and the remote sub-base of the present invention.

Referring now to FIG. 3 there shown is a block diagram of the thermostat of the present invention, which may have separate user interface and subbase portions. The user interface includes display 205, status indicators 206 and 207, data entry means 210, clocks 215A and B, analog to digital converter 216, temperature sensor 217, power backup 218, first communication bus means 220, second communication bus means 225, and microprocessor 230, low voltage detect circuit 240 and watchdog circuit 245. The user may enter desired time, temperature or other relevant information (e.g. desired humidity) into the system through use of the data entry means and the display. The display shows relevant information such as setpoint, start time, current time and current temperature. In a preferred embodiment, the data entry means is a keyboard having a four by four matrix of keys and the display is a liquid crystal display having at least one hundred forty segments. The data entry means however could be one or more switches or a rotatable wheel assembly while the display may be made from a plurality of light sources such as light emitting diodes(LEDs). Further, status indicators 206 and 207 are preferably LEDs which are used to provide information on overall and safety system status.

In a preferred embodiment, the microprocessor will be an LC5868 four bit microcontroller having 8K Read Only Memory (ROM) and 256×4 Random Access Memory (RAM) and memory 235 will be a 1 Kbit EEPROM. The microprocessor memory is used, among other functions, to store instructions for microprocessor 230 operation, to display information on display 205, to accept input from the data entry means 210 and to communicate with the remote subbase 250. Memory 235 stores time and temperature pairs for controlling the temperature of the space to a desired temperature during a selected time period and other user entered parameters.

The clocks are used to provide real time information and a common time base. While only one clock is necessary, in a preferred embodiment, two clocks are used. One clock may be a continuous oscillator 215A, while the other clock may be a temporary oscillator 215B. The continuous oscillator 215A may be used to provide low power, low speed timing functions to the microprocessor while the temporary oscillator 215B may be used to provide high speed timing when sufficient power is available.

Other backup features include power backup 218, low voltage detect circuit 240 and watchdog circuit 245. Power backup 218, in a preferred embodiment is a capacitor having a six hour supply for the operation of the user interface. Low voltage detect circuit shuts down the microprocessor in the event of low voltage to avoid damaging the microprocessor and to prevent misoperation of the microprocessor. The watchdog circuit monitors internal microprocessor signals and ensures that they are at the appropriate frequency and resets the microprocessor if there is a problem.

The display, data entry means and memory all communicate with the microprocessor directly. This provides the benefit of fast communication among these devices as the microprocessor generally receives and processes information faster than it can be entered by a user. However, while the first communication bus means 225 is part of the microprocessor, other arrangements are possible where the first communication bus means is separate from the microprocessor so long as user entered information is displayed on the display a rate faster than information can be entered.

The subbase 250 includes clock 255, microprocessor 260, second communication bus means 225, watchdog/low voltage detect circuit 274, memory 275, analog to digital converter 276, power supply 277, relay driver means 278, and sensor means 279. Second communication bus means 225 is the electrical communication link with user interface panel using a protocol described below. The electrical communication link may be via wire, radio frequency communication, fiber optic link or the like.

Microprocessor 260, may be an 8 Kbit microcontroller such as an MC68HCO5C8 having 8 Kbit ROM and 176×8 RAM. This microprocessor controls operation of the HVAC plant operating on instructions which may be loaded at a factory into the microprocessor's ROM. These instructions may include such well known concepts as minimum on time and the adaptive recovery process described below. The memory 275 may be a 1 Kbit EEPROM. The desired state of the HVAC plant is accomplished through appropriate electrical signals to the relay driver means 278. Timing of all functions is provided by clock 255, which may be a crystal oscillator.

Power supply 277 supplies power to all components needing power in the remote subbase. It also provides power via link 277A to the user interface panel 200.

Sensor means 279 allows sensors beyond the temperature sensor 217 of the user interface panel to control the operation of the system. As examples, a second temperature sensor, a humidity sensor or a carbon dioxide sensor may be connected. Memory 275 then would include instructions such as temperature averaging for the second temperature sensor case, or fan operation instructions for the humidity and/or carbon dioxide cases.

The protocol which is used to communicate between in the second bus means has as its goal to allow the remote subbase to be just a temperature controller without having to account for scheduling. This is done through use of a six hundred baud, five bit protocol. Four bits are used for the message and one bit is used as a start of message indicator. Both microprocessors have read and write memory access to the microprocessor RAM and the external memory (235, 275) of the other microprocessor. Information which is sent across the second communication bus means includes setpoints, period crossing flags, time until temperature, current temperature and setup information such as model number and type.

It should be noted that while the preferred embodiment of the present invention is described with a separate user interface and subbase, a single piece thermostat with a single microprocessor is also contemplated. The invention resides in the ability of a thermostat to control multiple different types of thermostats, not in the separation of functions.

As noted above, adaptive recovery programs are used to achieve a desired actual temperature in a space at the start of an upcoming time-temperature period while minimizing energy use. Energy consumption is reduced by delaying recovery start as late as possible and restricting auxiliary heat use during the recovery period.

Figure 4:
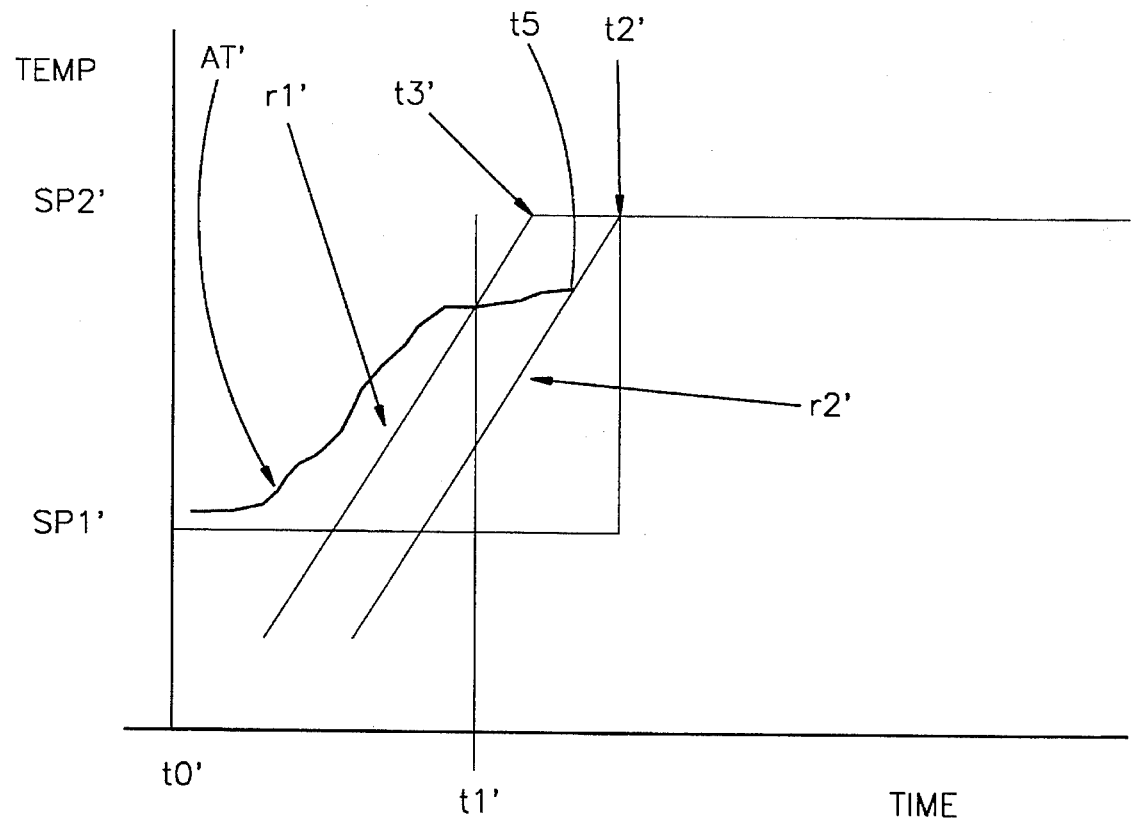
FIG. 4 is a time versus temperature graph of a setpoint period change and ramps used in the adaptive recovery process.

Referring now to FIG. 4, there shown is a time versus temperature graph of the setpoint and recovery ramps as they exist in the present invention. SP 1' represents the setpoint between times t0' and 12'. SP2' represents the setpoint from time 12' on. Time 12' represents the boundary between two periods. r1' is the temperature ramp for the furnace or heat pump, while r2' represents the ramp for the auxiliary heat. t1' represents the time when the actual temperature AT' crosses r1'. At this point, the setpoint snaps to SP2'. If AT continues to cross r2' at time 15, auxiliary heat would be instituted. It should be noted that the same type of graph could be drawn for a cooling process where the recovery would involve a drop in setpoint and the main ramp would have a negative slope. There is no auxiliary ramp for the cooling mode.

To accomplish this recovery, the adaptive recovery program includes three main processes: precalculations, state calculations and post calculations. The program also includes a subprocess for updating the slopes of the ramps. FIGS. 5A–D will detail each of these subprocesses.

Figure 5A:
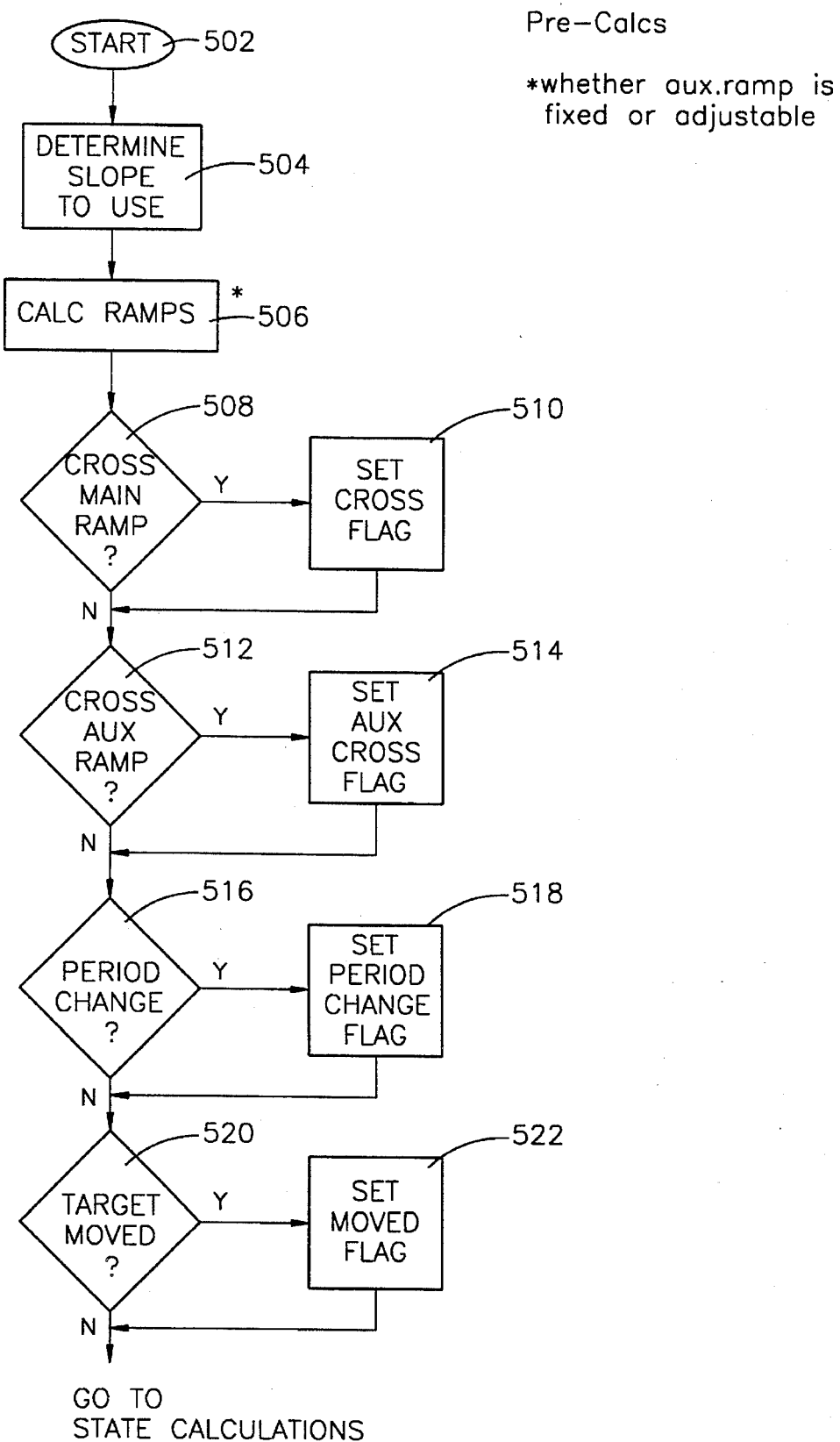
FIGS. 5A, 5B, 5C, 5D are flowcharts.

After starting at FIG. 5A block 502, the precalculation process moves to block 504 where the process determines which slope to use. In a preferred embodiment, there are four different slopes to use: heat AM, heat PM, cool AM and cool PM. The slope used is dependent upon the current operation mode (heating or cooling) and the time of the next setpoint relative to noon and midnight. The initial slopes used for each are constants such as 5° F./hr for heating and –3° F./hr for cooling. Through the process described below, the slopes are corrected to ensure timely arrival at the target temperature. Then, the ramps are calculated at block 506 by determining the target time, the slope and any desired lead time.

Next, at decision block 508, the process determines whether the actual temperature AT has crossed the main ramp. If so, the microprocessor sets a cross over flag in memory at block 510 and moves to block 514. If not, the process moves to decision block 512 and determines whether the auxiliary ramp has been crossed by AT.

If yes, then the microprocessor sets an auxiliary cross flag at block 514 and moves to block 516. If not, the process moves on to block 516 where the microprocessor determines if a period change has occurred. If so, the microprocessor sets a period crossing flag and moves to block 520. If not, the process moves directly to block 520.

At this point, the adaptive recovery process moves into the state calculation process. In the preferred embodiment, there are five possible states and fifteen events which could change the current state during this process. The five possible states include: 1) idle; 2) wait to cross ramp; 3) recovering—Aux disabled; 4) wait to cross ramp-Aux used during wait; and 5) recovering-Aux enabled. In addition, three flags may be set: one to disable the main ramp slope update for certain event-state combinations, one to identify that the slope must be updated for missing the desired recovery target and one to identify that the slope must be updated for achieving an early recovery.

The fifteen events of FIG. 5B will now be described. Event fifteen involves any catastrophic occurrence where an adaptive recovery reset or disabling is necessary. Regardless of the start state, the state is reset to "Idle" for either a reset or a disabling. Event fourteen occurrences include: 1) a command to shut adaptive recovery off; 2) change from heating to cooling mode or vice versa; 3) input data data to the process is not fresh; 4) sensor has gone bad, 5) system setting is off or Emergency Heat.

Event fourteen involves a change in time-temperature period and an auxiliary ramp for the new period was crossed. This is event only occurs when an auxiliary heat stage exists and a heating mode recovery greater than 0° F. exists. Generally, this will occur if the user programs a short period with large target temperature setpoint jump and the slope of the auxiliary ramp is shallow. With the exception of the current state being "Idle", where no action occurs, the state is reset to "recovering-Aux enabled". In addition, the "disable slope update flag" is set.

Event thirteen occurs when a period change has occurred and a main ramp for the new period was crossed when a temperature recovery greater than 0° F. exists in a heating or cooling mode. This event occurs if the user programs a short period with large target temperature setpoint jump and the main slope is shallow. With the exception of the current state being "Idle", where no action occurs, the end state is reset to "recovering Aux disabled". In addition, the "disable slope update flag" is set.

Event twelve occurs when a period change occurs and no main ramp has for the new period has been crossed. With the exception of the current state being "Idle", where no action occurs, the end state is reset to "wait to cross ramp". In addition, the "disable slope update flag" is cleared.

Event eleven involves the target temperature being manually moved and an aux ramp and main ramp have been crossed for the current period. For this event to occur, an aux heat stage must exist and a heating recovery greater than 0° F. must be present. In this instance, except for the "Idle" state where nothing occurs, the state is reset to "wait to cross ramp" and the "disable slope update flag" is set.

Event ten occurs when the target temperature is manually moved and a main ramp for the current period was crossed where a heat or cool recovery greater than 0° F. exists. Except for the Idle state where nothing occurs, the state is reset to "recovering-Aux enabled" and the "disable slope update flag" is set.

Event nine occurs when the target temperature was manually moved but a recovery ramps is no longer crossed. If the current state is "Idle", no change in state occurs. If the current state is either "wait to cross ramp" or "recovering-Aux disabled", the state is reset to "wait to cross ramp". If the current state is either "wait to cross ramp-Aux used during wait" or "recovering-Aux enabled", the state is reset to "recovering-Aux enabled".

Event eight involves a crossing of both an aux ramp and main ramp where an aux heat stage exists and a heat recovery greater than 0° F. exists. The only state to which this will apply is if the current state is "recovering-Aux disabled" in which case the state is changed to "recovering-Aux enabled" and the "update slope(late aux)" flag is set.

Event seven involves crossing of a main ramp only and the heat recovery is greater than 0° F. This event is only applicable to the "wait to cross ramp" and "wait to cross ramp-Aux used during wait" states in which the state is changed to "recovering Aux disabled".

Event six occurs when the time until temperature drops to under a preselected amount (in the preferred embodiment-fifteen minutes) and the temperature has not yet been reached. This event applies only to the "wait to cross ramp" and "recovering aux disabled" states. If the current state is "wait to cross ramp", the state remains the same and the "disable slope update" flag is set. If the current state is "recovering-Aux disabled", the "update slope (late)" and "disable slope update" flags are set.

Event five occurs when the target temperature was reached during a recovery attempt. This occurs when the actual temperature reaches the target temperature before the preselected lead-time for the target. This event only applies to the "recovery-Aux disabled" state in which the state is reset to "recovery-Aux enabled" and the "update slope(early)" and "disable slope update" flags are set.

Event four occurs when auxiliary heat was used to maintain temperature during the current period. This applies only to the "wait to cross ramp" state and causes a reset to wait to "cross ramp-Aux used during wait" state and the setting of the "disable slope update" flag.

Event three involves enabling of the adaptive recovery process when the current aux ramp is already crossed where the heat recovery is greater than 0° F. and an auxiliary heat stage exists. This event only applies to the "Idle" state in which case the state is reset to "recovering-Aux enabled" and the "disable slope update" flag is set.

Event two involves enabling of the adaptive recovery process where only the main ramp for the current period was crossed and a heat or cool recovery greater than 0° F. exists. This event only applies to the "Idle" state in which case the state is reset to "recovering-Aux enabled" and the "disable slope update" flag is set.

Event one involves the enabling of the adaptive recovery process only. This event only applies to the "Idle" state and the process resets the state to "wait to cross ramp" and clears the "disable update slope" flag.

The state calculations process starts at block 524, and then the process determines whether Event fifteen occurred. If not, the process moves to block 532. If so, the process determines whether the current state is applicable to event fifteen. If not the process moves to block 532. If so, the process then does the actions specified for event fifteen and goes to the post calculation process.

Figure 5B:
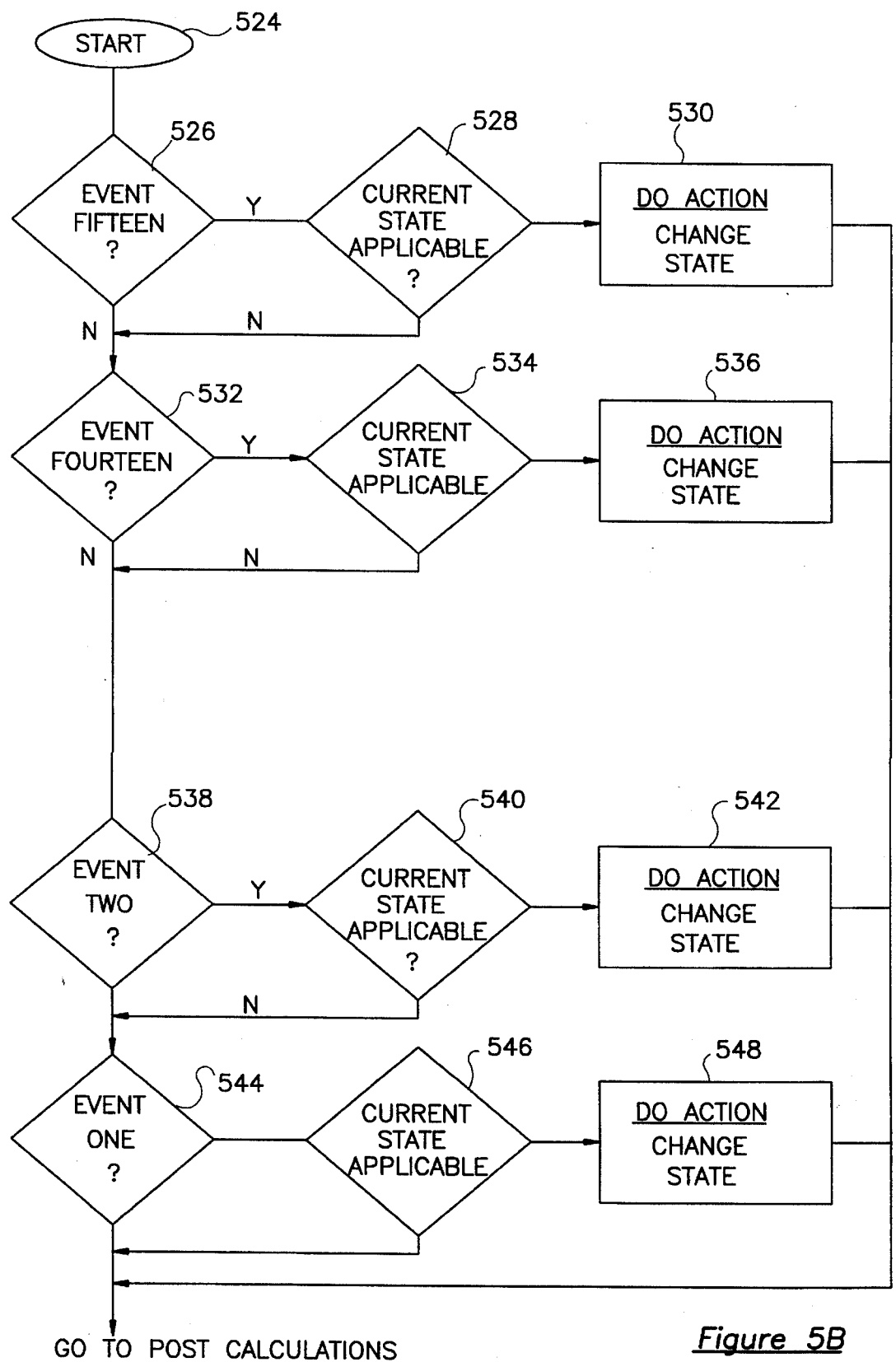

As can be seen from FIG. 5B, the state calculations process moves through these steps for each event. For clarity, events thirteen down to three have been omitted from the diagram, but operate in identical fashion as described above.

Figure 5C:
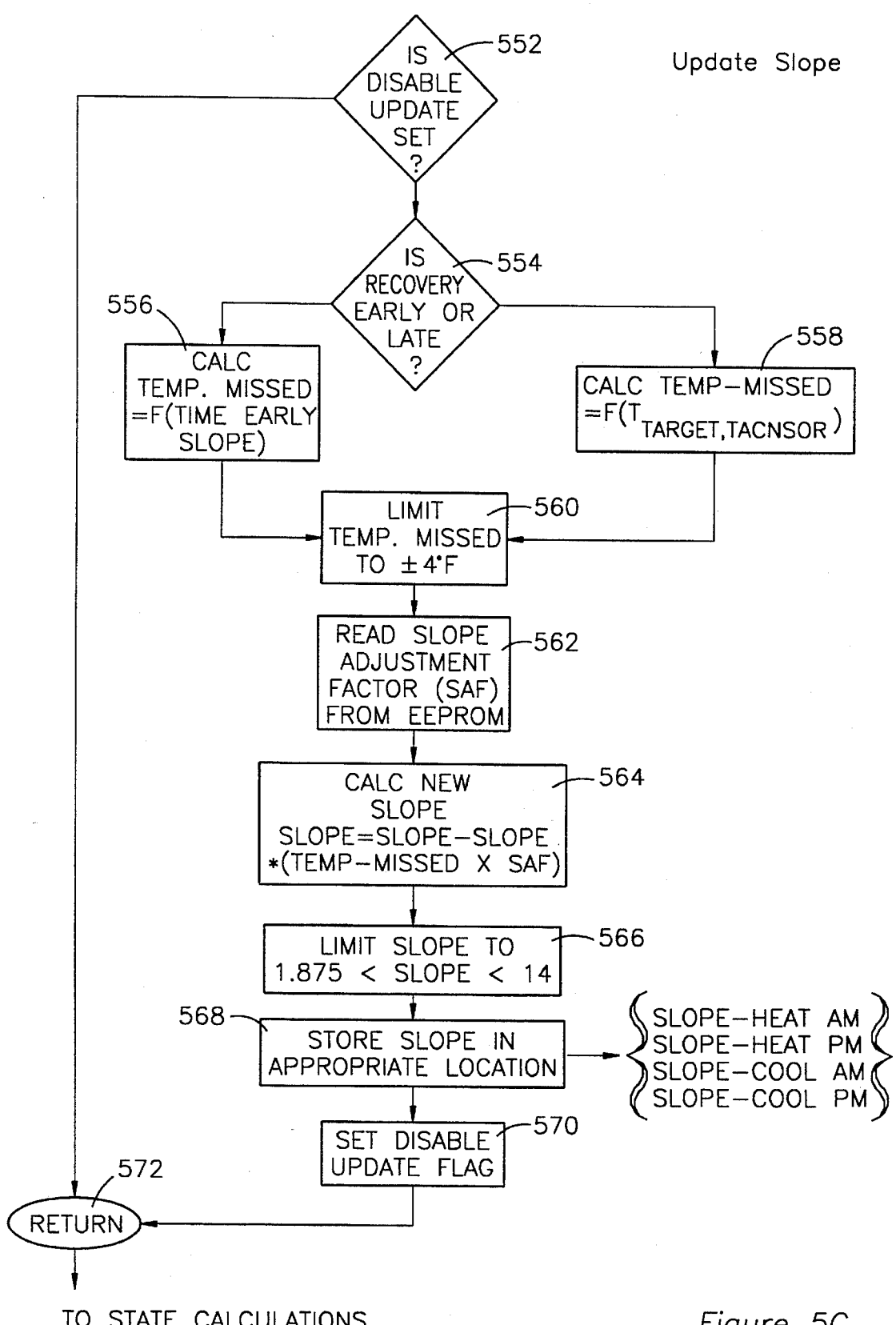

Referring now to FIG. 5C, there shown is a flow chart of the update slopes subprocess. This subprocess is entered when the current status is recovering-Aux disabled and event eight, six or five occurs. After starting at block 550, the process determines whether the disable update slope flag is set. If so, the process moves to the return block 572. If not, the process moves on to block 554 where the process determines whether the update slope (early) or update slope (late) flag has been set. If early, the process moves to block 556 where the process determines how early the temperature was reached using the factor temp_missed, where temp_missed is approximated from the time_until_temperature, slopeold, and an early correction factor and then moves on to block 560.

If late, the process moves to block 558 where temp_missed is calculated from the difference between the current temperature and the target temperature. The process then moves to block 560 where if the temp_missed is limited to a preset amount, here four degrees. For temp_missed less than the preset amount, the temp_missed is left unmodified.

The process then moves to block 562 where a slope adjustment factor (SAF) is read from memory The (SAF) was determined by simulation to optimize stability in the slope of the ramps. In a preferred embodiment, the SAF was set equal to 0.125 for heat ramps and −0.0625 for cool ramps. Other SAF values could be used to optimize other parameters.

The process then moves on to block 564 where a new slope is calculated using slopenew=slopeold−slopeold * (temp_missed * correct_factor) where the slopeold is equal to the slope of the current ramp (m in the linear equation y=mx+b).

Next, at block 566, limits are set on the slope which can be used. In the preferred embodiment, the slope is bounded by 1.875° F./hr and 14° F./hr.

In block 588, slopes are stored in selected locations. In the preferred embodiment, the locations are appropriate for the mode of operation of the device (heating or cooling) and the period of use (am or pm).

Lastly for the update slope process, the disable slope update flag is set at block 570 and the process returns at block 572 to the post calculation process.

Figure 5D:
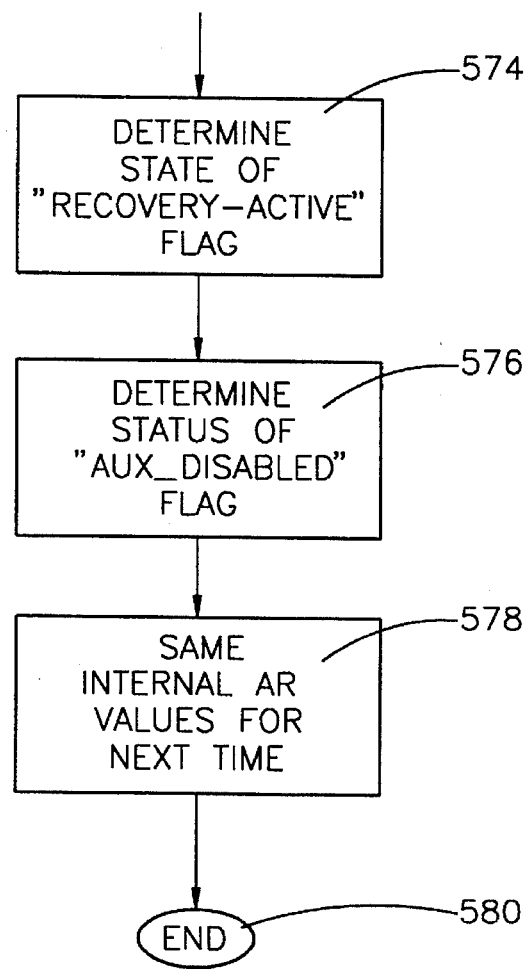

The post recovery process of FIG. 5D begins at block 574 by determining the state of a recovery active flag. The process then moves to block 576 where the status of a aux-disabled flag is checked. Lastly, the values just calculated are save at 578 before ending at 580.

For heat pump subbases with the auxiliary (AUX) stage configured, a secondary or auxiliary heat ramp/line is used to re-enable the auxiliary heat stage that was disabled when the heating mode recovery began. When the sensed temperature falls below the current auxiliary ramp/value, the auxiliary stage is re-enabled and can then be used, if required by the temperature control algorithm. The auxiliary stage cannot energize until the auxiliary ramp/line is crossed unless auxiliary cycling occurred after the start of the last period and before the start of the recovery period.

The auxiliary ramp/line's slope may be adjusted to be twice that of the primary ramp/line's slope. A lower slope limit of 5° F./hr is applied to the auxiliary slope. For heat pump applications, the invention has an adjustable auxiliary heat ramp/line that works with the main heat ramp/line. This helps to minimize auxiliary stage usage, but still guarantee timely recoveries.

A recovery attempt is designated "complete" when the sensed temperature reaches the target temperature, when the auxiliary ramp/line is crossed, or when fifteen minutes prior to a period is reached, whichever occurs first. The term "complete" does not always imply that sensed temperature has reached target temperature. In the case of the auxiliary ramp/line crossing, the control algorithm continues to attempt to drive the sensed temperature toward target temperature. In the case of the fifteen minutes prior to period ending being reached, the control algorithm will still continue to drive the sensed temperature toward the target temperature.

In summary, the foregoing has been a description of a novel and unobvious temperature control device. This description is meant to provide examples, not limitations. The applicants define their invention through the claims appended hereto.

I claim:

1. A thermostat having system, heating, cooling and fan control capabilities for a plurality of types of HVAC plants, comprising:

a temperature sensor producing a temperature signal representative of space temperature;

a microprocessor having internal memory and producing a current time signal;

read only memory connected to the microprocessor, the read only memory storing time and temperature pairs and an adaptive recovery process used by the microprocessor for achieving a desired temperature by a target time, the microprocessor determining a time until temperature change value based on the time and temperature pairs and the current time signal, a main ramp, an auxiliary ramp and comparing the temperature signal to the main ramp and the auxiliary ramp, the memory further storing a table of system states and system events and process flags, the microprocessor internal memory storing a current state from the system states and current status of process flags, the microprocessor causing a desired state to occur and setting/clearing of a process flag according to a state-event pair from the table on the occurrence of one of the events.

2. A temperature control device for controlling the operation of an HVAC plant such that a desired temperature is maintained, comprising:

a user interface having a first microprocessor, first read only memory and a temperature sensor connected to the first microprocessor, the first microprocessor controlling the operation of the user interface, the first read only memory storing time and temperature pairs for control of the HVAC plant entered by a user through the data entry means, the first microprocessor producing a time until temperature signal based upon the time and temperature pairs and the current time, the temperature sensor producing a temperature signal representative of space temperature; and a subbase electrically connected to the user interface and having a second microprocessor having internal memory and second read only memory, said second read only memory storing an adaptive recovery process used by the second microprocessor for achieving a desired temperature by a desired time, the second microprocessor receiving the time until temperature change signal and creating, a main ramp, an auxiliary ramp and comparing the temperature signal to the main ramp and the auxiliary ramp, the memory further storing a table of system states and events and process flags, the microprocessor internal memory storing a current state from the system states and current status of process flags, the microprocessor causing a desired state to occur and setting/clearing of a process flag according to a state-event pair from the table on the occurrence of one of the events.

3. A method of adaptive temperature recovery in a temperature control device, comprising the steps of:

determining a current actual temperature;

producing a current time signal;

producing a time until temperature signal based on the current time signal and stored time temperature pairs;

producing a main ramp having one point fixed at a next time and temperature pair and having a slope which is initially at a preselected value;

producing an auxiliary ramp having one point fixed at a next time and temperature pair and having a slope which is a predetermined factor of the slope of the main ramp storing a current state and current status for a plurality of process flags;

waiting for an event to occur;

modifying the current state and current status of the process flags appropriately based upon state-event-process flag table;

updating the slope of the main ramp when enabled by appropriate status of a process flag by determining whether a target temperature was reached late or on time-early, and modifying the slope as a function of the old slope, the difference between the target temperature and the actual temperature at the target time if the process was late, otherwise modifying the slope as a function of the old slope and the time until temperature at the point the target temperature is reached; and modifying the slope of the auxiliary ramp as a function of the slope of the main ramp.

* * * * *